(12) United States Patent
Fukuma

(10) Patent No.: US 8,385,639 B2
(45) Date of Patent: Feb. 26, 2013

(54) COMPRESSIVE CODING DEVICE AND VISUAL DISPLAY CONTROL DEVICE

(75) Inventor: Kenji Fukuma, Amagasaki (JP)

(73) Assignee: Yamaha Corporation (JP)

( * ) Notice: Subject to any disclaimer, the term of this patent is extended or adjusted under 35 U.S.C. 154(b) by 207 days.

(21) Appl. No.: 12/824,939

(22) Filed: Jun. 28, 2010

(65) Prior Publication Data

US 2011/0002551 A1    Jan. 6, 2011

(30) Foreign Application Priority Data

Jul. 1, 2009 (JP) ............................. P2009-156990

(51) Int. Cl.
*G06K 9/00* (2006.01)
(52) U.S. Cl. ........................................................ 382/166
(58) Field of Classification Search ........................ None
See application file for complete search history.

(56) References Cited

U.S. PATENT DOCUMENTS

| | | | | |
|---|---|---|---|---|
| 5,724,441 | A * | 3/1998 | Yoshida ........................ | 382/166 |
| 5,956,425 | A * | 9/1999 | Yoshida ........................ | 382/234 |
| 6,043,811 | A * | 3/2000 | Kato et al. ..................... | 345/632 |
| 6,426,809 | B1 * | 7/2002 | Hayashi et al. ................ | 358/529 |
| 6,594,385 | B2 * | 7/2003 | Grohs et al. .................. | 382/166 |
| 7,158,669 | B2 * | 1/2007 | Tanaka et al. ................. | 382/166 |
| 7,609,882 | B2 * | 10/2009 | Lee et al. ....................... | 382/166 |
| 7,986,837 | B2 * | 7/2011 | Aoki ............................. | 382/176 |
| 7,991,238 | B2 * | 8/2011 | Malvar et al. ................. | 382/239 |
| 2001/0041003 | A1 * | 11/2001 | Grohs et al. .................. | 382/166 |
| 2008/0304762 | A1 * | 12/2008 | Matsumoto ................... | 382/243 |
| 2010/0329548 | A1 * | 12/2010 | Yoshimura ................... | 382/164 |

FOREIGN PATENT DOCUMENTS

| | | |
|---|---|---|
| JP | 11-205788 A | 7/1999 |
| JP | 2000138836 A | 5/2000 |
| JP | 2003-087572 A | 3/2003 |
| JP | 2007129455 A | 5/2007 |

OTHER PUBLICATIONS

Office Action Issued in Corresponding Japanese Patent Application 2009-156990 dated Dec. 18, 2012.
Office Action Issued in Corresponding Japanese Patent Application 2009-156990 dated Dec. 14, 2012.

* cited by examiner

*Primary Examiner* — Samir Ahmed
(74) *Attorney, Agent, or Firm* — Rossi, Kimms & McDowell LLP

(57) ABSTRACT

A compressive coding device converts three color components of pixel data from the RGB presentation to the YCbCr presentation according to a mapping rule. Converted pixel data are subsequently subjected to irreversible compressive coding, thus producing compressive coded data. Pixel data ascribed to transparency control are converted to a prescribed value out of a mapping range according to the mapping rule. Compressive coded data are supplied to a visual display control device, in which they are decoded and reproduced into original pixel data of the first color presentation. Compressive coded data corresponding to pixel data ascribed to transparency control are rendered with a prescribed color in the RGB presentation which is designated as transparency in advance or not rendered on screen. Thus, it is possible to precisely perform the transparency control without causing a reduction of the compression factor regardless of the irreversible compressive coding and decoding.

4 Claims, 10 Drawing Sheets

FIG. 8

| OUTPUT DATA | INPUT DATA | | | |
| --- | --- | --- | --- | --- |
| | 8 BITS | 6 BITS | 5 BITS | 4 BITS |
| -1,1 | 255,-255 | 63,-63 | 31,-31 | 15,-15 |
| -3,-2,2,3 | 253,254,-254,-253 | 61,62,-62,-61 | 29,30,-30,-29 | 13,14,-14,-13 |
| -7..-4,4..7 | 249..252,-252..-249 | 57..60,-60..-57 | 25..28,-28..-25 | 9..12,-12..-9 |
| -15..-8,8..15 | 241..248,-248..-241 | 49..56,-56..-49 | 17..24,-24..-17 | 8 |
| -31..-16,16..31 | 225..240,-240..-225 | 33..48,-48..-33 | 16 | |
| -63..-32,32..63 | 193..224,-224..-193 | 32 | | |
| -127..-64,64..127 | 129..192,-192..-129 | | | |
| -255..-128,128..255 | 128 | | | |

FIG. 9

| DECIMAL NOTATION | BINARY NOTATION | | BINARY NOTATION | DECIMAL NOTATION |
|---|---|---|---|---|
| 63 | 0 1 1 1 1 1 | → | 1 1 1 1 1 1 | -1 |
| 62 | 0 1 1 1 1 0 | → | 1 1 1 1 1 0 | -2 |
| 61 | 0 1 1 1 0 1 | → | 1 1 1 1 0 1 | -3 |
| 60 | 0 1 1 1 0 0 | → | 1 1 1 1 0 0 | -4 |
| 59 | 0 1 1 0 1 1 | → | 1 1 1 0 1 1 | -5 |
| 58 | 0 1 1 1 0 1 0 | → | 1 1 1 1 0 1 0 | -6 |
| 57 | 0 1 1 1 0 0 1 | → | 1 1 1 1 0 0 1 | -7 |
| 56 | 0 1 1 1 0 0 0 | → | 1 1 1 1 0 0 0 | -8 |
| 55 | 0 1 1 0 1 1 1 | → | 1 1 1 0 1 1 1 | -9 |
| 54 | 0 1 1 0 1 1 0 | → | 1 1 1 0 1 1 0 | -10 |
| 53 | 0 1 1 0 1 0 1 | → | 1 1 1 0 1 0 1 | -11 |
| 52 | 0 1 1 0 1 0 0 | → | 1 1 1 0 1 0 0 | -12 |
| 51 | 0 1 1 0 0 1 1 | → | 1 1 1 0 0 1 1 | -13 |
| 50 | 0 1 1 0 0 1 0 | → | 1 1 1 0 0 1 0 | -14 |
| 49 | 0 1 1 0 0 0 1 | → | 1 1 1 0 0 0 1 | -15 |
| 48 | 0 1 1 0 0 0 0 | → | 1 1 1 0 0 0 0 | -16 |
| ∫ | ∫ | | ∫ | ∫ |
| 35 | 0 1 1 0 0 1 1 | → | 1 1 0 0 0 1 1 | -29 |
| 34 | 0 1 0 0 0 1 0 | → | 1 1 0 0 0 1 0 | -30 |
| 33 | 0 1 0 0 0 0 1 | → | 1 1 0 0 0 0 1 | -31 |
| 32 | 0 1 0 0 0 0 0 | | 1 1 0 0 0 0 0 | -32 |
| 31 | 0 0 1 1 1 1 1 | ← | 1 0 1 1 1 1 1 | -33 |
| 30 | 0 0 1 1 1 1 0 | ← | 1 0 1 1 1 1 0 | -34 |
| 29 | 0 0 1 1 1 0 1 | ← | 1 0 1 1 1 0 1 | -35 |
| ∫ | ∫ | | ∫ | ∫ |
| 3 | 0 0 0 0 0 1 1 | ← | 1 0 0 0 0 1 1 | -61 |
| 2 | 0 0 0 0 0 1 0 | ← | 1 0 0 0 0 1 0 | -62 |
| 1 | 0 0 0 0 0 0 1 | ← | 1 0 0 0 0 0 1 | -63 |
| 0 | 0 0 0 0 0 0 0 | | | |

FIG. 10

| CODED OBJECT | S | CODE | ADDITIONAL BITS |
|---|---|---|---|
| -1,1 | 1 | 01 | 0,1 |
| -3,-2,2,3 | 2 | 10 | 00,01,10,11 |
| -7..-4,4..7 | 3 | 110 | 000..011,100..111 |
| -15..-8,8..15 | 4 | 1110 | 0000..0111,1000..1111 |
| -31..-16,16..31 | 5 | 11110 | 00000..01111,10000..11111 |
| -63..-32,32..63 | 6 | 111110 | 000000..011111,100000..111111 |
| -127..-64,64..127 | 7 | 1111110 | 0000000..0111111,1000000..1111111 |
| -255..-128,128..255 | 8 | 11111110 | 00000000..01111111,10000000..11111111 |
| -256,256 | 9 | 111111110 | NULL |
| ZRL = 1 | 9 | 000 | NULL |
| ZRL = 2...3 | 10 | 0010 | 0,1 |
| ZRL = 4...7 | 11 | 00110 | 00,01,10,11 |
| ALL 0 | 12 | 001110 | NULL |
| ZRL = 8...15 | 13 | 0011110 | 000...111 |
| ZRL = 16...31 | 14 | 00111110 | 0000...1111 |
| ZRL = 32...63 | 15 | 001111110 | 00000...11111 |
| ZRL = 64...127 | 16 | 0011111110 | 000000...111111 |
| ZRL = 128...255 | 17 | 00111111110 | 0000000...1111111 |
| ZRL = 256...511 | 18 | 001111111110 | 00000000...11111111 |
| ZRL = 512...1023 | 19 | 0011111111110 | 000000000...111111111 |

COMPRESSIVE CODING DEVICE AND VISUAL DISPLAY CONTROL DEVICE

BACKGROUND OF THE INVENTION

1. Field of the Invention

The present invention relates to compressive coding devices which in particular perform irreversible compressive coding on visual data subjected to transparency control. The present invention also relates to visual display control devices which decode compressive coded data so as to display graphics on screen.

The present application claims priority on Japanese Patent Application No. 2009-156990 (filing date: Jul. 1, 2009), the content of which is incorporated herein by reference.

2. Description of the Related Art

Sprite-mode visual processing LSI (Large Scale Integration) devices are typical examples of visual processing devices used for game devices. This type of visual processing devices performs a series of procedures in which a sprite pattern memory stores visual data of sprites (i.e. independent graphic objects) representing game characters; visual data are read from the sprite pattern memory in conformity with the progression of a game; visual data are edited via rotation and scaling (i.e. expansion and reduction) and written into a buffer; thereafter, images and graphics are displayed on the screen of a liquid crystal display (LCD) based on the stored contents of the buffer. This type of visual processing devices performs an overlay representation in which the background image is overlaid with sprites such as game characters. The overlay representation is implemented by way of transparency control in which pixels corresponding to the background of each sprite are rendered in transparency and visualized on the screen. In the transparency control, visual processing devices choose colors of pixels each rendered in transparency in advance so as not to display pixels whose data indicate the transparency on the screen.

Normally, sprite-mode visual processing devices perform compressive coding on visual data stored in sprite pattern memory. The compressive coding technology is generally classified into reversible compressive coding and irreversible compressive coding. The reversible compressive coding is a combination of predictive coding and variable-length coding, for example. The reversible compressive coding is able to perfectly restore original visual data (i.e. visual data prior to compressive coding) based on compressive coded data (i.e. visual data already subjected to compressive coding) but unable to obtain a high compression factor. The irreversible compressive coding employs orthogonal transformation, for example. The irreversible compressive coding is able to obtain a high compression factor but unable to perfectly restore original visual data based on compressive coded data. For this reason, the reversible compressive coding and the irreversible compressive coding are alternately changed according to needs. That is, the reversible compressive coding is employed when it needs to perfectly restore original visual data, while the irreversible compressive coding is employed when it needs to reduce the amount of compressive coded data.

In the case of compressive coding on visual data subjected to transparency control, it is preferable to alternately change the reversible compressive coding and the irreversible compressive coding upon considering the necessity of reducing the amount of compressive coded data. The irreversible compressive coding on visual data subjected to transparency control suffers from drawbacks in which pixels ascribed to transparency control are not rendered in transparency, and pixels not ascribed to transparency control are rendered in transparency. For example, FIG. 14A shows that the transparency is designated by "0xFFFFFF" (where primary-color components R, G, and B are each set to "0xFF"), wherein pixel data ascribed to transparency control is changed into "0xFEFEFE" due to the irreversible compressive coding and decoding so that it is not rendered in transparency. FIG. 14B shows that the transparency is designated by "0x000000", wherein input pixel data of "0x0101010" not ascribed to transparency control is changed into "0x000000" due to the irreversible compressive coding and decoding so that it is rendered in transparency. These drawbacks are originated in the property of the irreversible compressive coding in which original visual data cannot be perfectly restored based on compressive coded data.

Patent Documents 1 and 2 disclose solutions to the above drawbacks, wherein compressive coded data are attached with mask data, in which binary data discriminating whether pixel data are subjected to transparency control or not are aligned along with the sequence of pixels. As shown in FIGS. 14C and 14D, an additional bit is added to each pixel data already subjected to irreversible compressive coding so as to discriminate whether each pixel data is subjected to transparency control or not. The additional bit of "1" indicates that each pixel data is subjected to transparency control while "0" indicates that each pixel data is not subjected to transparency control. Using the additional bit, it is possible to easily discriminate pixel data whether they are subjected to transparency control or not. Using the additional information such as mask data and additional bits, it is possible to precisely perform the transparency control in a decoding procedure after the irreversible compressive coding on visual data representing transparent pixels.

Patent Document 1: Japanese Patent Application Publication No. H11-205788

Patent Document 2: Japanese Patent Application Publication No. 2003-87572

In the above technology in which the additional information is attached to compressive coded data, it is necessary to evaluate the overall compression factor considering the amount of the additional information. Compared with the conventional technology in which the additional information is not attached to compressive coded data, this technology suffers from a reduction of the compression factor. Since the irreversible compressive coding has an advantage yielding a high compression factor compared with the reversible compressive coding, the additional information may impair the advantage of the irreversible compressive coding.

SUMMARY OF THE INVENTION

It is an object of the present invention to provide a compressive coding device which is able to precisely perform transparency control on visual data in a decoding procedure without reducing a compression factor of the irreversible compressive coding.

It is another object of the present invention to provide a visual display control device which decodes compressive coded data subjected to transparency control so as to display graphics on screen.

The present invention handles visual data composed of three color components constituting pixels displayed on screen. A compressive coding device of the present invention is configured of a discrimination section which discriminates whether or not three color components of pixel data rendered in the first color presentation (e.g. the RGB presentation) are each ascribed to transparency control; a conversion section which converts pixel data of the first color presentation not ascribed to transparency control into pixel data of the second color presentation (e.g. the YCbCr presentation) according to a mapping rule while converting pixel data ascribed to transparency control into a predetermined value out of a mapping range according to the mapping rule; and an irreversible compressive coding section which performs irreversible compressive coding on converted pixel data, thus producing compressive coded data. It is possible to configure the above sections in the hardware or in the software executed by a computer.

A visual display control device of the present invention performs display control using compressive coded data produced by the above compressive coding device. It is constituted of a receiving section which receives compressive coded data from the compressive coding device, a decoding section which decodes compressive coded data via the inverse of irreversible compressive coding, and a display control section which discriminates whether or not pixel data have a predetermined value out of a mapping range according to a mapping rule. The display control section performs transparency control on pixel data having the predetermined value out of the mapping range, while the display control section converts other pixel data into the first color presentation via the inverse of the mapping rule, thus controlling a display device to render the first color presentation.

In the compressive coding device, pixel data ascribed to transparency control and having the predetermined value out of the mapping range is subjected to reversible compressive coding, while pixel data not ascribed to transparency control, whose value falls within the mapping range according to the mapping rule, is subjected to the irreversible compressive coding. Since pixel data having the predetermined value out of the mapping range is subjected to the reversible compressive coding, the visual display control device is able to precisely discriminate whether or not decoded pixel data are ascribed to transparency control by way of a simple decision as to whether or not decoded pixel data have the predetermined value out of the mapping range.

In the above, pixel data ascribed to transparency control is subjected to mapping into the predetermined value which is far above the upper-limit value of the mapping range or far below the lower-limit value of the mapping range. This is because compressive coded data already subjected to irreversible compressive coding are unlikely decoded into a far deviated value from the mapping range; hence, it is likely that pixel data ascribed to transparency control is still distant from the mapping range irrespective of the irreversible compressive coding and decoding. For this reason, the present invention guarantees that pixel data ascribed to transparency control be reliably discriminated by way of a simple decision as to whether or not decoded pixel data is out of the mapping range.

In addition, at least one of three color components of converted pixel data is selectively subjected to the reversible compressive coding, while the other components of converted pixel data are subjected to the irreversible compressive coding. This makes it possible for the visual display control device to precisely discriminate whether or not decoded pixel data are ascribed to transparency control by way of a simple decision as to whether or not at least one of three components of decoded pixel data is out of the mapping range.

BRIEF DESCRIPTION OF THE DRAWINGS

These and other objects, aspects, and embodiments of the present invention will be described in more detail with reference to the following drawings.

FIG. 8 shows the relationship between input data and output data with respect to a predictive error conversion process performing sign bit inversion on the predictive error.

FIG. 9 shows the relationship between input data and output data with respect to the predictive error conversion process performing the sign bit inversion on the predictive error of six bits (except for a sign bit).

FIG. 10 shows a conversion table which a variable-length coding process refers to when converting the predictive error into a variable-length code.

DESCRIPTION OF THE PREFERRED EMBODIMENTS

The present invention will be described in further detail by way of examples with reference to the accompanying drawings.

1. First Embodiment

Figure 1:
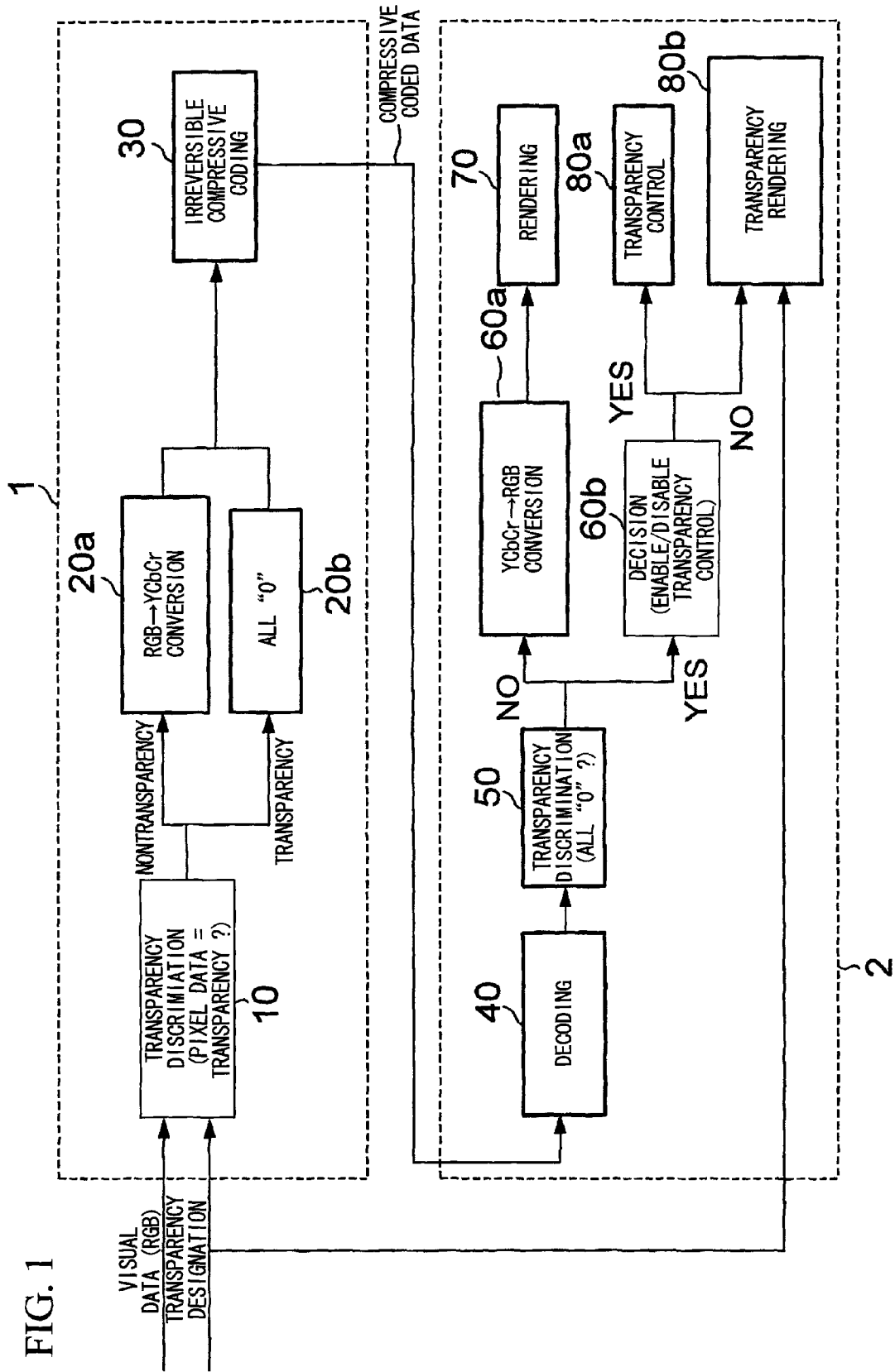
FIG. 1 is a block diagram showing a compressive coding/decoding system including a compressive coding device and a visual display control device according to a first embodiment of the present invention.

FIG. 1 is a block diagram showing the constitution of a compressive coding/decoding system including a compressive coding device 1 and a visual display control device 2 according to the first embodiment of the present invention. In the compressive coding/decoding system, visual data ascribed to transparency control are subjected to irreversible compressive coding in the compressive coding device 1, thereafter, they are decoded in the visual display control device 1, thus displaying images and graphics on screen. The compressive coding device 1 performs irreversible compressive coding on visual data so as to produce compressive coded data. Compressive coded data can be stored in digital storage media such as a CD-ROM (Compact Disk Read-Only Memory) and distributed to users or consumers. Alternatively, compressive coded data can be downloaded to users or consumers via telecommunication lines such as the Internet. Thus, it is possible to achieve an irreversible compressive coding and transmission procedure with respect to visual data. The visual display control device 2 decodes compressive coded data so as to control presentation of images and graphics on screen based on decoding results. Visual data is a set of pixel data forming a screen image, wherein each pixel data represents the brightness (or luminance) with respect to each of three primary color components R, G, and B. In the first embodiment, the brightness of each color component is represented by 8 bits whose value varies from "0" to "255" in decimal notation, whereby each pixel data is configured of 24 (=3×8) bits.

The compressive coding device 1 is constituted of a digital signal processor (DSP), for example. An irreversible compressive coding program (implementing an irreversible compressive coding procedure which is an essential feature of the first embodiment) is installed in the compressive coding device 1. That is, the compressive coding device 1 performs the irreversible compressive coding procedure according to the irreversible compressive coding program. The irreversible compressive coding procedure includes a transparency discrimination process 10, an RGB→YCbCr conversion process 20a, an all-zero (or all "0") conversion process 20b, and an irreversible compressive coding process 30.

First, pixel data (each configured of color components R, G, and B in the form of 24 bits) are input into the compressive coding device 1. Upon designating the transparency, the compressive coding device 1 performs the transparency discrimination process 10 on each of input pixel data (representing pixels forming a screen image). In the transparency discrimination process 10, it is discriminated whether or not the value of each pixel data is equal to the predetermined value representing the transparency. When the transparency is represented by "0xFFFFFF" (where "0xFF" (i.e. "255" in decimal notation) is set to the brightness (or intensity) with respect to each of color components R, G, and B), for example, the transparency discrimination process 10 discriminates pixel data whose value is not equal to "0xFFFFFF" as a nontransparent pixel; hence, pixel data are subjected to the RGB→YCbCr conversion process 20a. The RGB→YCbCr conversion process 20a performs mapping on nontransparent pixel data according to a mapping rule (1) implementing conversion from the RGB presentation to the YCbCr presentation. The RGB→YCbCr conversion process 20a converts R, G, B components into Y, Cb, Cr components, each of which is equal to or above "16".

$$Y = 0.257 \times R + 0.504 \times G + 0.098 \times B + 16$$

$$Cb = -0.148 \times R - 0.291 \times G + 0.439 \times B + 128$$

$$Cr = 0.439 \times R - 0.368 \times G - 0.071 \times B + 128 \quad (1)$$

The transparency discrimination process 10 discriminates pixel data of "0xFFFFFF" as transparent pixel data, which are subjected to the all-zero conversion process 20b that convert pixel data into "0x000000". Herein, "0x000000" is out of a mapping range in the mapping from the RGB presentation to the YCbCr presentation; hence, it serves as a key to discriminate whether or not pixel data is ascribed to the transparency control when an image or graphics is displayed on screen based on decoding results of a decoding device (i.e. the visual display control device 2). In the first embodiment, "0x000000" will be referred to as a controlled object indicator.

The irreversible compressive coding process 30 performs irreversible compressive coding on pixel data which are already subjected to either the RGB→YCbCr conversion process 20a or the all-zero conversion process 20b in units of pixels, thus producing compressive coded data. The first embodiment employs an irreversible compressive coding algorithm, according to which pixel data having a controlled object indicator is subjected to the irreversible compressive coding and decoding so as to decode the controlled object indicator, while pixel data rendered in the YCbCr presentation is subjected to the irreversible compressive coding and decoding so as to decode a value different from the controlled object indicator. This makes it possible to reliably discriminate whether or not pixel data is ascribed to the transparency control in the decoding device using the above key of pixel data. Compressive coded data are produced by way of the above irreversible compressive coding algorithm and transmitted to the visual display control device 2. In this connection, the first embodiment uses "0x000000" as the controlled object indicator; but this is not a restriction. It is possible to selectively use a specific value (or an irreversible compressive coding algorithm), which is out of the mapping range from the RGB presentation to the YCbCr presentation and which reliably secure restoration of original visual data via the irreversible compressive coding and decoding (in other words, which is comparable to the reversible compressive coding).

Next, the visual display control device 2 will be described in detail. Similar to the compressive coding device 1, the visual display control device 2 is constituted of a digital signal processor (DSP). A program which implements decoding of compressive coded data and display control based on decoding results is installed in the visual display control device 2 in advance. According to the above program, the visual display control device 2 performs a decoding process 40, a transparency discrimination process 50, a YCbCr→RGB conversion process 60a, a decision process 60b, a rendering process 70, and a transparency control process 80a, and a transparency rendering process 80b. Upon inputting compressive coded data (produced by the compressive coding device 1) and designating the transparency (whose code is identical to the above code of the transparency designated in the compressive coding device 1), the visual display control device 2 performs the decoding process 40 (which is an inversion of the irreversible compressive coding process 30) on compressive coded data. The decoding process 40 produces either pixel data ascribed to the YCbCr presentation or pixel data having a controlled object indicator.

The transparency discrimination process 50 discriminates whether or not each of pixels constituting graphics represented by visual data, which are decoded in the decoding process 40, is ascribed to transparency control based on pixel data. Specifically, the discrimination result of the transparency discrimination process 50 is "YES" when pixel data concurs with the controlled object indicator, while the discrimination result is "NO" when pixel data does not concur with the controlled object indicator. The controlled object indicator is certainly decoded even when pixel data having the controlled object indicator is sequentially subjected to the irreversible compressive coding and decoding. In contrast, the controlled object indicator is not decoded when pixel data rendered in the YCbCr presentation is sequentially subjected to the irreversible compressive coding and decoding. For this reason, the transparency discrimination process 50 is able to accurately discriminate whether or not each pixel data is ascribed to transparency control.

Pixel data whose discrimination result is "NO" in the transparency discrimination process 50 and which are therefore rendered in the YCbCr presentation are subjected to the YCbCr→RGB conversion process 60a in which they are converted into pixel data rendered in the RGB presentation according to a rule (2). Subsequently, they are subjected to the rendering process 70 by which the corresponding graphics are rendered in R, G, and B colors on screen.

$$R=1.164\times(Y-16)+1.596\times(Cr-128)$$

$$G=1.164\times(Y-16)-0.391\times(Cb-128)-0.813\times(Cr-128)$$

$$B=1.164\times(Y-16)+2.018\times(Cb-128) \quad (2)$$

Pixel data whose discrimination result is "YES" in the transparency discrimination process 50 are subjected to the decision process 60b as to whether or not they are ascribed to transparency control. Pixel data whose decision result is "YES" in the decision process 60b are subjected to the transparency control process 80a in which they are not rendered on screen. Pixel data whose decision result is "NO" are subjected to the transparency rendering process 80b in which they are rendered in colors designated as transparency on screen.

As described above, the controlled object indicator is certainly decoded with respect to pixel data having the controlled object indicator by way of the irreversible compressive coding and decoding, while another value different from the controlled object indicator is decoded with respect to pixel data rendered in the YCbCr presentation. The first embodiment is able to accurately discriminate whether or not pixel data are each ascribed to the transparency control in the decoding device (i.e. the visual display control device 2) based on decoding results of pixel data without using the additional information such as additional bits. The first embodiment disusing the additional information does not cause a reduction of the compression factor in the irreversible compressive coding. The first embodiment is able to accurately perform the transparency control in the decoding device without reducing the compression factor in the irreversible compressive coding on visual data ascribed to transparency control.

2. Second Embodiment

Figure 2:
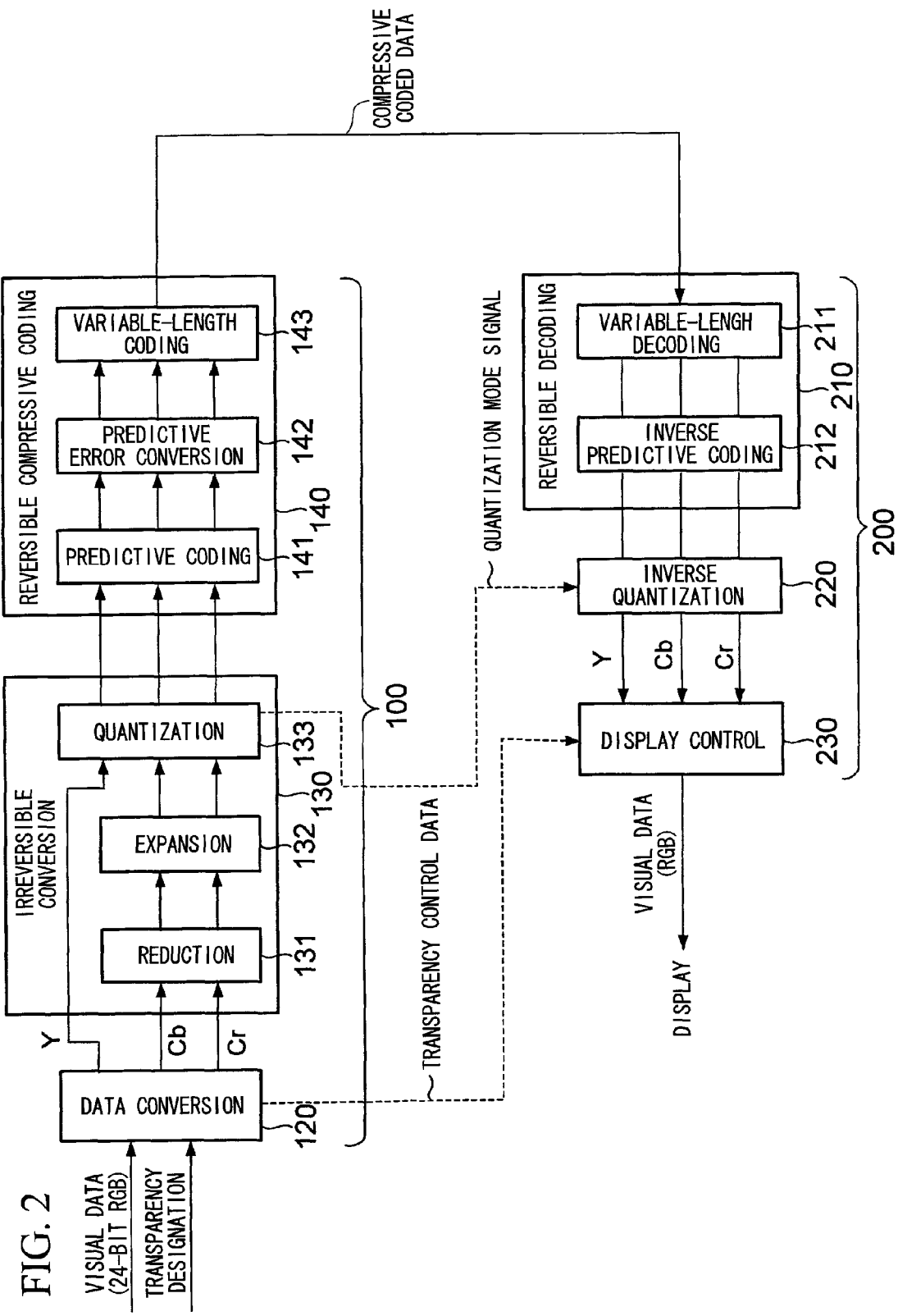
FIG. 2 is a block diagram showing a compressive coding/decoding system including a compressive coding device and a visual display control device according to a second embodiment of the present invention.

FIG. 2 is a block diagram showing the constitution of a compressive coding/decoding system including a compressive coding device 100 and a visual display control device 200 according to the second embodiment of the present invention. Similar to the compressive coding/decoding system of FIG. 1, the compressive coding/decoding system of FIG. 2 performs compressive coding on visual data (rendered in R, G, and B colors configured of 24 bits), transmits compressive coded data, and performs decoding on compressive coded data, so that images and graphics are rendered on screen based on decoding results. Unlike the compressive coding/decoding system of FIG. 1, the compressive coding/decoding system of FIG. 2 employs an irreversible compressive coding algorithm which is incomparable to the reversible compressive coding with respect to the controlled object indicator.

Similar to the compressive coding device 1 shown in FIG. 1, the compressive coding device 100 shown in FIG. 2 is constituted of a digital signal processor (DSP). An irreversible compressive coding program (implementing the irreversible compressive coding which is an essential feature of the second embodiment) is installed in the compressive coding device 1 in advance. The compressive coding device 100 is constituted of a data conversion process 120, an irreversible conversion process 130, and a reversible compressive coding process 140. The second embodiment implements these processes by way of the software; but this is not a restriction. For example, it is possible to configure the data conversion process 120 by means of a data conversion circuit and to configure the irreversible conversion process 130 and the reversible compressive coding process 140 by means of an irreversible compressive coding circuit, wherein these electronic circuits are combined together to form the hardware of the compressive coding device 100.

Figure 3:
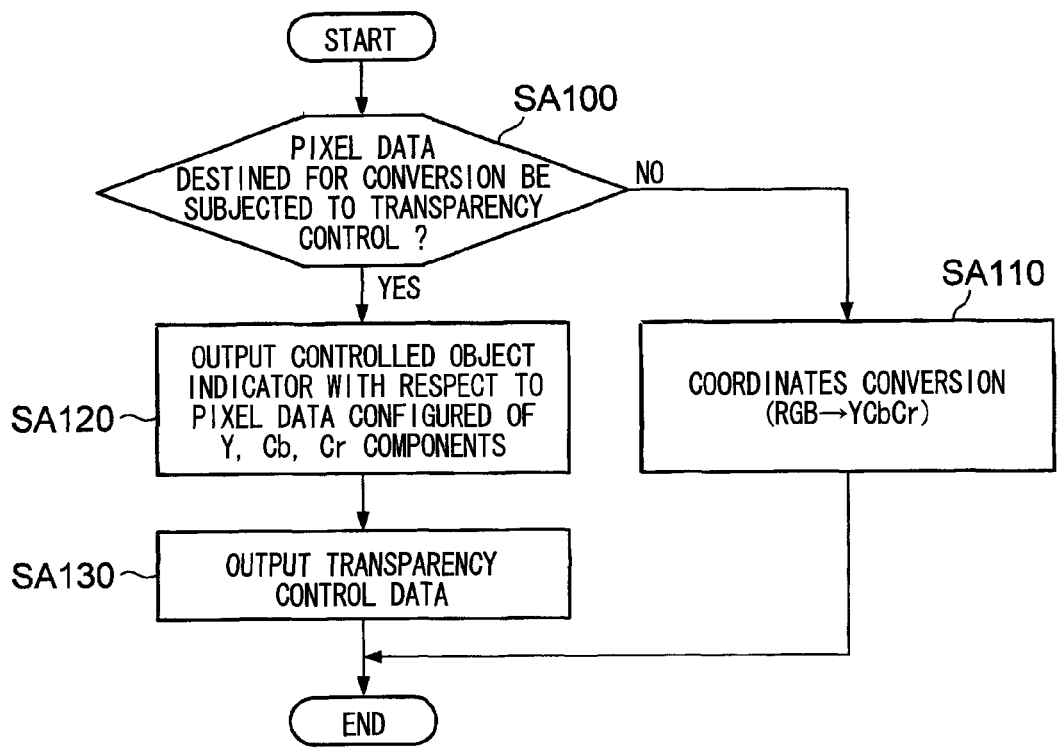
FIG. 3 is a flowchart showing a data conversion process of the compressive coding device shown in FIG. 2.

The data conversion process 120 converts visual data (i.e. 24-bit pixel data rendered in the RGB presentation subjected to the irreversible compressive coding) into data suited to subsequent processes. The data conversion process 120 is equivalent to the transparency discrimination process 10, the RGB→YCbCr conversion process 20a, and the all-zero conversion process 20b shown in FIG. 1. FIG. 3 is a flowchart of the data conversion process 120. The data conversion process 120 is performed on pixel data (representing pixels constituting a screen image) included in visual data subjected to the irreversible compressive coding in units of pixels. For example, pixel data prior to conversion are each selected from among visual data (subjected to the irreversible compressive coding) in a raster-scanning sequence and processed according to the flowchart of FIG. 3.

First, the data conversion process 120 makes a decision as to whether or not pixel data prior to conversion is subjected to transparency control in step SA100. The decision of step SA100 is equivalent to the transparency discrimination process 10. The flow proceeds to step SA110 regarding a coordinates conversion when the decision result of step SA100 is "NO", while the flow proceeds to steps SA120 and SA130 when the decision result is "YES".

Figure 4:
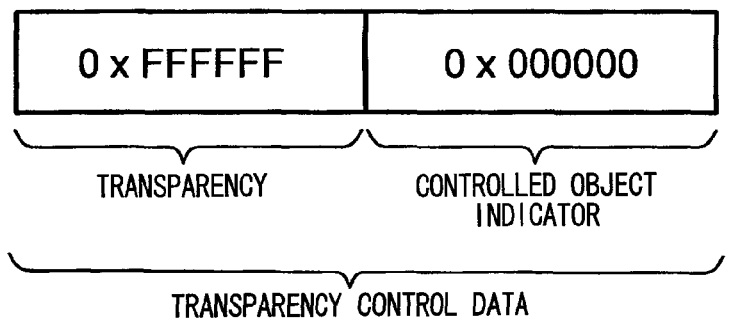
FIG. 4 shows an example of transparency control data produced by the compressive coding device.

The coordinates conversion of step SA110 is a mapping from the RGB presentation to the YCbCr presentation; hence, it is equivalent to the RGB→YCbCr conversion process 20a. Step SA120 outputs the controlled object indicator, which is out of the mapping range according to the mapping rule (1), as pixel data configured of Y, Cb, and Cr components. Specifically, the controlled object indicator is smaller than the lower-limit value of the mapping range, which is calculated according to the mapping rule, or larger than the upper-limit value of the mapping range. Subsequently to step SA120, step SA130 produces a transparency control data (see FIG. 4) representing the correspondence between the transparency and the controlled object indicator. The transparency control data are supplied to the decoding device, i.e. the visual display control device 200. The transparency control data are involved in the transparency control and visual presentation (or in the visual presentation disabling the transparency control) in the visual display control device 200.

A first feature of the second embodiment is similar to that of the first embodiment in which the controlled object indicator is set to "0x000000", which is by far lower than the lower-limit value of "0x101010" in the mapping range according to the mapping rule (1). The reason why the second embodiment employs such a very low value as the controlled object indicator will be described below.

Pixel data completed in the data conversion process 120 are subsequently subjected to the irreversible compressive coding (which is implemented by way of the irreversible conversion process 130 and the irreversible compressive coding process 140 in the second embodiment). The second embodiment does not necessarily decode the controlled object indicator based on pixel data having the controlled object indicator passing through the irreversible compressive coding and decoding. It cannot be presumed that values greatly deviated from an original value be reproduced through the irreversible compressive coding and decoding. The second embodiment converts pixel data ascribed to transparency control into a greatly deviated value from the upper-limit value and the lower-limit value of the mapping range which is calculated based on other pixel data not ascribed to transparency control. Using such a greatly deviated value, it is possible to simply discriminate whether or not decoded pixel data are each out of the mapping range. Thus, it is expected to accurately discriminate whether or not pixel data passing through the irreversible compressive coding and decoding are each ascribed to transparency control in the decoding device without using the additional information such as additional bits. This is the reason why the second embodiment sets the controlled object indicator to a greatly deviated value of "0x000000" from the lower-limit value of the mapping range. In other words, a second feature of the second embodiment is to employ an irreversible compressive coding and decoding algorithm securing that pixel data passing through the irreversible compressive coding and decoding be certainly out of the mapping range. Details of the second feature of the second embodiment will be described later.

Although the data conversion process 120 is not intended for the color presentation conversion from the RGB presentation to the YCbCr presentation, for the sake of convenience, pixel data passing through the data conversion process 120 will be referred to as "pixel data of the YCbCr presentation". In this connection, the second embodiment simply refers to a single color designated as transparency; but it is possible to designate plural colors as transparency. In a multi-color mode in which multiple colors are designated as transparency, they are assigned with different controlled object indicators so that transparency control data represent the correspondence between controlled object indicators and multiple colors designated as transparency.

Figure 5A:
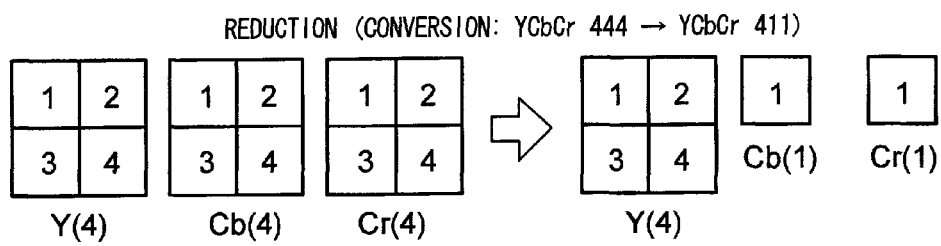
FIG. 5A shows a reduction process included in an irreversible conversion process of the compressive coding device.
Figure 5B:
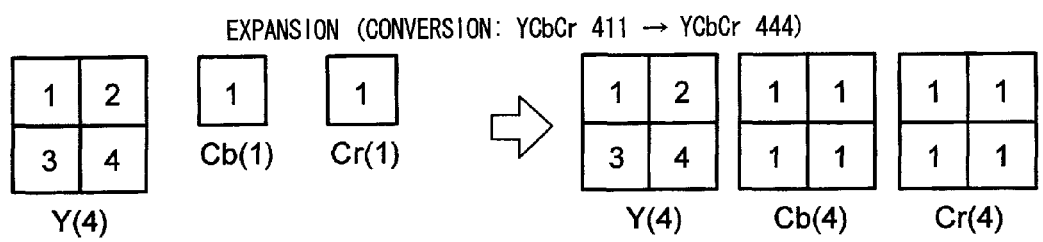
FIG. 5B shows an expansion process included in the irreversible conversion process of the compressive coding device.

The irreversible conversion process 130 is a pre-processing intended to improve the compression factor in the reversible compressive coding process 140. The irreversible conversion process 130 is constituted of a reduction process 131, an expansion process 132, and a quantization process 13. The reduction process 131 and the expansion process 132 handle two components Cb and Cr among three components Y, Cb, and Cr of pixel data output from the data conversion process 120. The reduction process 131 subdivides pixel data configured of Cb and Cr components in units of matrixes each configured of 2×2 pixels as shown in FIG. 5A. The reduction process 131 eliminates three pixels from each matrix configured of four pixels except for the upper-left pixel with respect to pixel data of Cb and Cr components, thus converting "YCbCr 444" (representing all of Y, Cb, and Cr components holding four pixels) into "YCbCr 411" (representing that the Y components still holds four pixels while the Cb and Cr components each hold one pixel). In other words, the reduction process 131 thins out three pixels per every four pixels. The expansion process 131 interpolates thinned-out pixels using the remaining pixel (i.e. the upper-left pixel within four pixels of each matrix, which is not thinned out in the reduction process 131) as shown in FIG. 5B. In an aspect for the improvement of the compression factor of visual data, it is better to perform compressive coding on pixel data of YCbCr 411 (see FIG. 5A) rather than pixel data of YCbCr 444 (see FIG. 5B). Nonetheless, the second embodiment is designed such that the expansion process 132 converts pixel data of YCbCr 411 into pixel data of YCbCr 444. The reason why the second embodiment employs the above conversion will be described later in connection with the visual display control device 200. In this connection, the irreversible conversion process 130 does not perform the reduction process 131 and the expansion process 132 on the Y component of pixel data because the Y component represents the brightness of each pixel; hence, the picture quality must be significantly degraded when the Y component is thinned out. In addition, the irreversible conversion process 130 is carried out after the data conversion process 120 which converts pixel data of the RGB presentation into pixel data of the YCbCr presentation in order to prevent the degradation of the picture quality due to the reduction process 131, the expansion process 132, and the quantization process 133.

The quantization process 133 handles any one of or all of the Y, Cb, and Cr components of pixel data so as to reduce the number of bits configuring each of pixel data constituting visual data. The quantization process 133 is carried out with reference to a quantization-mode table of which stored contents is shown in Table 1, for example. The quantization-mode table can be embedded in the irreversible compressive coding program, or it can be stored in the compressive coding device 100 independently of the irreversible compressive coding program. The quantization-mode table (see Table 1) stores quantization coefficients (i.e. a Y-component quantization coefficient, a Cb-component quantization coefficient, and a Cr-component quantization coefficient), each representing the number of bits reduced in each component, in connection with quantization modes, i.e. seven modes with values "0" to "6" (where Mode=0 disuses the quantization process 133). In the quantization process 133, quantization coefficients are read from the quantization-mode table in response to a preset mode (or a mode indicated by a quantization mode signal given from an external device), so that the corresponding components of pixel data are subjected to rightward logical shifting by numbers of bits corresponding to quantization coefficients. Thus, it is possible to achieve quantization in response to the predetermined mode.

TABLE 1

| Mode | Y-component Quantization Coefficient | Cb-component Quantization Coefficient | Cr-component Quantization Coefficient |
| --- | --- | --- | --- |
| 0 | 0 | 0 | 0 |
| 1 | 1 | 0 | 0 |
| 2 | 1 | 1 | 1 |
| 3 | 2 | 0 | 0 |
| 4 | 2 | 1 | 1 |
| 5 | 2 | 2 | 2 |
| 6 | 3 | 2 | 2 |

In the case of MODE=1, pixel data is subjected to 1-bit rightward logical shifting so as to reduce one bit with respect to only the Y-component. In the case of MODE=2, pixel data is subjected to 1-bit rightward logical shifting so as to reduce one bit with respect to all the Y-component, Cb-component, and Cr-component. In the second embodiment shown in FIG. 2, pixel data passing through the irreversible conversion process 130 are subjected to the reversible compressive coding process 140 so as to output compressive coded data. Thereafter, compressive coded data are subjected to decoding in the visual display control device 200. The reversible compressive coding process 140 is a typical example of reversible calculations combining the predictive coding and the variable-length coding. Since the reversible compressive coding process 140 is preceded by the irreversible conversion process 130 configured of irreversible calculations, the compressive coding device 100 entirely performs irreversible calculations. As shown in FIG. 2, a quantization-mode signal representing a quantization mode of the quantization process 133 is transmitted from the compressive coding device 100 to the visual display control device 200. The quantization-mode signal is used in an inverse quantization process 220, which is the inverse of the quantization process 133, in the visual display control device 200.

Figure 6:
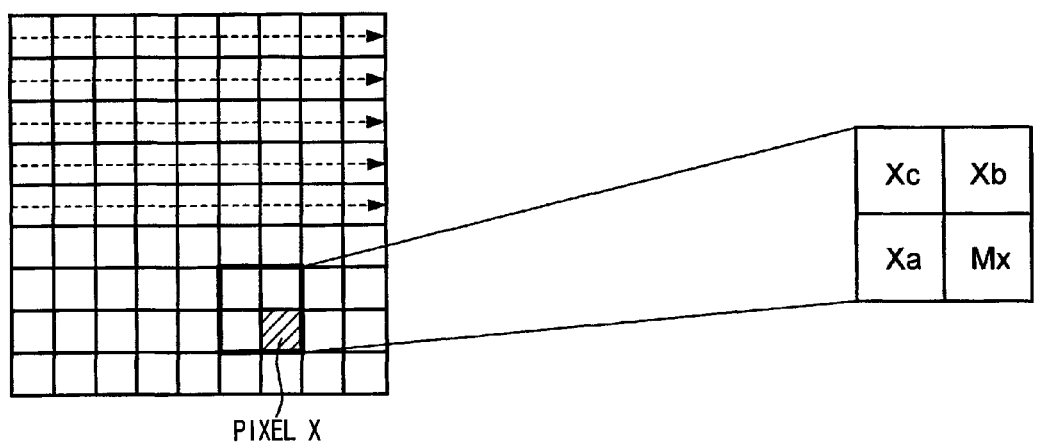
FIG. 6 is an illustration explaining a predictive coding process for calculating a predictive value and a predictive error with respect to each pixel.

The reversible compressive coding process 140 is constituted of a predictive coding process 141, a predictive error conversion process 142, and a variable-length coding process 143. As shown in FIG. 6, pixels constituting visual data subjected to compressive coding are selected in a raster-scanning sequence, wherein a pixel X is picked up and subjected to the predictive coding process 141, for example. The predictive coding process 141 calculates a predictive value Mx with respect to the pixel X in light of its adjacent pixels; then, it calculates the difference between the predictive value Mx and an actual value of the pixel X as a predictive error X−Mx.

Specifically, the predictive coding process 141 calculates the predictive value Mx according to the following algorithm. First, three adjacent pixels are picked up around the pixel X, i.e. a left-side pixel Xa (whose data is also denoted as "Xa"), an upper pixel Xb (whose data is also denoted as "Xb"), and an upper-left pixel Xc (whose data is also denoted as "Xc"). A maximum value "max(Xa,Xb,Xc)" among the pixel data Xa, Xb, and Xc is subjected to a decision as to whether or not Xc=max(Xa,Xb,Xc). When Xb<Xa on the condition of Xc=max(Xa,Xb,Xc), the predictive coding process 141 substitutes Xb for Mx. When Xa<Xb on the condition of Xc=max (Xa,Xb,Xc), the predictive coding process 141 substitutes Xa for Mx. If not Xc=max(Xa,Xb,Xc), a minimum value "min (Xa,Xb,Xc)" among the pixel data Xa, Xb, and Xc is subjected to a decision as to whether or not Xc=min(Xa,Xb,Xc). When Xb>Xa on the condition of Xc=min(Xa,Xb,Xc), the predictive coding process 141 substitutes Xa for Mx. If neither Xc=max(Xa,Xb,Xc) and Xc=min(Xa,Xb,Xc), in other words, when Xc>min(Xa,Xb,Xc) and Xc<max(Xa,Xb,Xc), the predictive coding process 141 sets Mx=Xa+Xb−Xc as the predictive value Mx. Thereafter, the predictive coding process 141 calculates the predictive error X−Mx (i.e. the difference between the predictive value Mx and the actual value of the pixel X).

Figure 7:
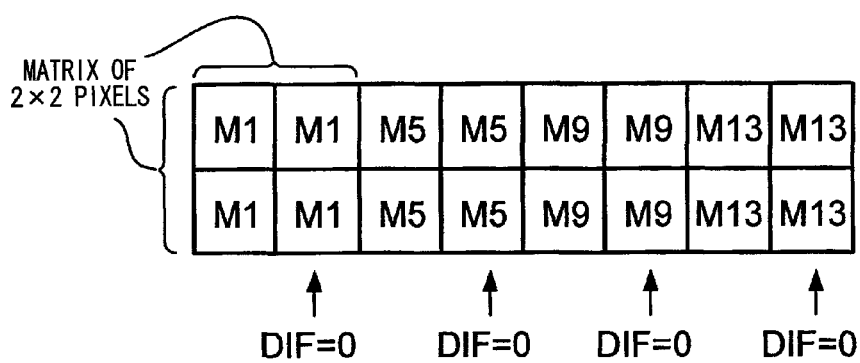
FIG. 7 shows an example of predictive errors which are calculated with respect to pixels of matrixes horizontally aligned.

The irreversible conversion process 130 produces a matrix configured of four pixel data in which the components Cb and Cr are set to the same value. As shown in FIG. 7, a plurality of matrixes is horizontally aligned. In the matrix, the predictive error of a lower-right pixel is normally set to zero. This guarantees that the predictive error be alternately set to zero in pixels horizontally aligned with respect to the components Cb and Cr. It is likely that predictive errors (sequentially calculated in the predictive coding process 141) be consecutively set to zero with respect to the components Cb and Cr. Detailed explanation is omitted, however, it is generally said that sizes of compressive coded data become smaller (in other words, the compression factor becomes higher) as more and more pixels whose predictive values are zero consecutively appear on screen.

The predictive error conversion process 142 performs sign bit inversion on the predictive error (calculated in the predictive coding process 141) when the sign bit inversion reduces the absolute value of the predictive error. The contents of the predictive error conversion process 142 differ with respect to the number of bits constituting the predictive error, i.e. the number of bits included in each of pixel data constituting visual data subjected to compressive coding. FIG. 8 shows the relationship between input data and output data with respect to the predictive error conversion process 142, wherein input data represent the predictive error whose number of bits (except for a sign bit) is changed with 8 bits, 6 bits, 5 bits, and 4 bits. FIG. 8 shows only the relationship between certain input data, whose absolute value decreases via the sign bit inversion, and the corresponding output data. That is, FIG. 8 does not show the relationship between other input data, whose absolute value does not decrease via the sign bit inversion, and the corresponding output data. In this case, the predictive error conversion process 142 does not perform sign bit inversion so that input data are directly output as output data.

FIG. 9 shows the relationship between input data and output data with respect to the predictive error conversion process 142 receiving the predictive error of six bits (except for a sign bit), wherein arrows designate directions of conversion. In the second embodiment, negative values of binary data (representing components of pixel data, predictive errors, etc.) are represented in two's complement. For example, the absolute value of a 6-bit predictive error (except for its sign bit) decreases to be lower than the original absolute value by way of the sign bit inversion when the original absolute value is 32 or more. For this reason, the predictive error conversion process 142 needs to perform the sign bit inversion on the "positive" predictive error whose absolute value is $2^{6-1}=32$ or more. In addition, the "negative" predictive error whose absolute value is 32 or more (i.e. a negative value of −32 or lower) decreases to be lower than the original absolute value by way of the sign bit inversion. For this reason, the predictive error conversion process 142 needs to perform the sign bit inversion on the "negative" predictive value whose absolute value is 32 or more. Similar operation is performed with respect to other predictive errors each consisting of a different number of bits. In the case of the predictive error of 8 bits, for example, the predictive error whose absolute value is $2^{8-1}=128$ or more is selectively subjected to the sign bit inversion. In the case of the predictive error of 5 bits, the predictive error whose absolute value is $2^{5-1}=16$ or more is selectively subjected to the sign bit inversion. In the case of the predictive error of 4 bits, the predictive error whose absolute value is $2^{4-1}=8$ or more is selectively subjected to the sign bit inversion.

The variable-length coding process 143 performs variable-length coding on the predictive error passing through the predictive error conversion process 142. As described above, the predictive coding process 141 calculates the predictive error with respect to the pixel X which is selected from among pixels constituting visual data subjected to compressive coding in a raster-scanning sequence. In the second embodiment, predictive errors which are sequentially calculated in the raster-scanning sequence in the predictive coding process 141 are sequentially subjected to the predictive error conversion process 142 and the variable-length coding process 143 in an order of calculations, thus sequentially converting them into variable-length codes. A set of variable-length codes is assembled into compressive coded data which are output from the compressive coding device 100.

FIG. 10 shows a conversion table which the variable-length coding process 143 refers to when converting predictive errors into variable-length codes. Similar to the quantization-mode table, the conversion table can be embedded in the irreversible compressive coding program, or it can be stored in the compressive coding device 100 independently of the irreversible compressive coding program. In the conversion table of FIG. 10, "CODING ITEM" denotes the predictive error passing through the predictive error conversion process 142, and "S" denotes a group number assigned to variable-length codes having the same length. A single variable-length code is constituted of a code and an additional bit, wherein the code serves as identification information discriminating a group of each variable-length code from other groups. The additional bit serves as identification information discriminating each variable-length code from other variable-length codes within a group of variable-length codes having a certain code.

Within coding items (i.e. predictive errors whose absolute value is not zero), predictive errors having a smaller absolute value are converted into variable-length codes having a shorter length, consisting of a code and an additional bit, in accordance with the conversion table of FIG. 10. For example, two coding items "−1" and "1" both of which have the same absolute value "1" are converted into variable-length codes belonging to the group number S=1 assigned with a code "01", wherein they are discriminated using additional bits "0" and "1" respectively. Four coding items "−3", "−2", "2", and "3" whose absolute values are "2" or "3" are converted into variable-length codes belonging to the group number S=2 assigned with a code "10", wherein they are discriminated using additional bits "00", "01", "10", and "11" respectively. Similarly, other coding items are subclassified into groups having consecutive absolute values, wherein groups having a higher absolute value are assigned with codes having a longer length. Except for the group number S=9 whose absolute value is "256", the number of coding items included in each group becomes larger with respect to groups having a higher absolute value; hence, the length of additional bits discriminating coding items correspondingly becomes longer. In the second embodiment, the maximum number of bits constituting the predictive error is set to eight bits (except for a sign bit); hence, "−256" and "256" represent overflow states. In this connection, the coding items "−256" and "256" are each assigned with the same code "11111110" and converted into variable-length codes having no additional bits.

With respect to coding items "ZRL" (i.e. Zero Run Length) whose absolute value is zero, consective-0s portions are converted into variable-length codes. For example, a coding item ZRL=1 whose absolute value is "1" is converted into a variable-length code belonging to the group number S=9 assigned with a code "000". Two coding items ZRL=2, 3 whose absolute values are "2" or "3" are converted into variable-length codes belonging to the group number S=10 assigned with a code "0010", wherein they are discriminated using additional bits "0" and "1" respectively. Four coding items ZRL=4, 5, 6, 7 whose absolute values range from "4" to "7" are converted into the group number S=11 assigned with a code "00110", wherein they are discriminated using additional bits "00", "01", "10", and "11". Similarly, other coding items "ZRL" are subclassified into groups having consecutive values of ZRL, wherein groups having a higher value of ZRL are assigned with codes having a longer length. The number of coding items "ZRL" included in each group becomes larger with respect to groups having a higher value of ZRL; hence, the length of additional bits discriminating coding items "ZRL" correspondingly becomes longer. The second embodiment assumes an "ALL0" state regarding the predictive error in order to improve the compression factor. In the ALL0 state, the predictive error is zero with respect to a presently designated pixel, and all the predictive errors are zero with respect to other pixels linearly aligned with the presently designated pixel. The ALL0 state is designated by a code "001110", so that the corresponding coding items are converted into variable-length codes having no additional bit.

The second embodiment performs the reduction process 131 and the expansion process 132 on pixel data with respect to the components Cb and Cr, so that predictive errors calculated for pixels aligned in a horizontal scanning line are alternately set to zero. Therefore, the consecutive-0s length likely becomes longer. For this reason, the second embodiment is designed to efficiently perform variable-length coding using ZRL, thus improving the compression factor.

Next, the visual display control device 200 will be described in detail. The visual display control device 200 decodes compressive coded data output from the compressive coding device 100 so as to reproduce visual data, which are supplied to a display unit such as a liquid crystal display (not shown) so as to control visual presentation on screen. Similar to the compressive coding device 100, the overall function of the visual display control device 200 is realized according to a decoding program or the like installed in a digital signal processor (DSP) or a computer. The visual display control device 200 performs a reversible decoding process 210, the inverse quantization process 220, and a display control process 230 according to the decoding program. The second embodiment realizes these processes by way of the software; but this is not a restriction. For example, it is possible to configure the reversible decoding process 210 and the inverse quantization process 220 by means of a decoding circuit and to configure the display control process 230 by means of a display control circuit, wherein these electronic circuits are combined together to form the hardware of the visual display control device 200.

The reversible decoding process 210 is the inverse of the reversible coding process 140 and is constituted of a variable-length decoding process 211 and an inverse predictive coding process 212. The variable-length decoding process 211 is the inverse of the variable-length coding process 143. The variable-length coding process 211 reproduces predictive errors (prior to the variable-length coding process 143) from variable-length codes composed of additional bits and codes with reference to the same conversion table used in the variable-length coding process 143. The inverse predictive coding process 212 is the inverse of the predictive coding process 141. Based on predictive errors reproduced in the variable-length decoding process 211, the inverse predictive coding process 212 converts compressive coded data into pixel data having components Y, Cb, and Cr corresponding to predictive errors. Detailed operation of the inverse predictive coding process 212 will be described with respect to the situation where the inverse predictive coding process 212 receives the predictive error of the pixel data X on the condition that three pixel data Xa, Xb, and Xc have been already decoded as shown in FIG. 6 with respect to one of components Y, Cb, and Cr. In this situation, the inverse predictive coding process 212 calculates the predictive value Mx of the pixel data X based on the pixel data Xa, Xb, and Xc according to an algorithm similar to that of the predictive coding process 141. The predictive value Mx is added to the predictive error so as to produce the "entire" pixel data X. By performing the reversible decoding process 210 on compressive coded data output from the predictive coding device 100, it is possible to perfectly restore original pixel data prior to the reversible compressive coding process 140 of the compressive coding device 100. In other words, it is possible to perfectly restore pixel data of the YCbCr presentation acquired via the data conversion process 120 on pixel data of the RGB presentation and pixel data acquired via the irreversible conversion process 130.

According to the mapping rule (1), pixel data composed of components Y, Cb, and Cr have a positive value (precisely, a value of sixteen or more); hence, pixel data passing through the quantization process 133 has a value of zero or more. On the precondition that pixel data composed of components Y, Cb, and Cr prior to the predictive coding process 141 has a positive value, the inverse predictive coding process 212 recognizes a data portion (except for a sign bit) of the addition result of the predictive error and the predictive value Mx as the decoding result of pixel data. For this reason, the inverse predictive coding process 212 reproduces the same pixel data based on the predictive error irrespective of a sign bit (where "0" indicates a positive value, while "1" indicates a negative value) as long as the data portion (except for a sign bit) of input pixel data remains the same. The compressive coding device 100 needs to perform the predictive error conversion process 142 owing to the above feature of predictive coding in which a sign bit "1"/"0" of the predictive error does not affect the decoding result, since it is necessary to reduce the absolute value of the coding item (i.e. the predictive error) in the variable-length coding process 143 and to reduce the length of a variable-length code after conversion, in other words, it is necessary to reduce the amount of compressive coding data, thus improving the compression factor. A concrete example of this operation will be described below.

Suppose that pixel data is configured of six bits (except for a sign bit) with respect to each of components Y, Cb, and Cr, and the predictive error is configured of six bits; pixel data X is set to "59d" (where "d" denotes a decimal notation), the predictive value is set to "10d", and the predictive error is set to "49d=0110001b" (where "b" denotes a binary notation, and a first bit "0" is a sign bit representing a positive value) with reference to the conversion table of FIG. 10. When the compressive coding device 100 does not perform the predictive error conversion process 142, for example, the variable-length coding process 143 converts the predictive error "49d" into a 12-bit variable length code composed of a code of the group number S=6 "111110" and additional bits "110001" with reference to the conversion table of FIG. 10. In the visual display control device 200, the variable-length decoding process 211 reproduces the predictive error "49d" from the variable-length code output from the compressive coding device 100. The inverse predictive coding process 212 performs a binary addition according to an equation (3) on the predictive value "10d=0001010b" and the reproduced predictive error "49d=0110001b", thus reproducing the original pixel data X of "59d".

$$0001010b + 0110001b = 0111011b = 59d \quad (3)$$

In contrast to the above operation, the visual display control device 200 cooperates with the compressive coding device 100 including the predictive error conversion process 142 as follows.

According to FIG. 9, the predictive error "49d" is converted into "0110001b" (where a first bit denotes a sign bit). Changing the sign bit from "0" to "1" yields "1110001b", which corresponds to "−15d" in decimal notation. The absolute value of "−15d" is smaller than the absolute value of "49d". In the compressive coding device 100, the predictive error conversion process 142 converts the predictive error into "1110001b=−15d" by inverting the sign bit. Subsequent to the predictive error conversion process 142, the variable-length coding process 143 converts the sign-bit inverted predictive error of "1110001b=−15d" into an 8-bit variable-length code which is constituted of additional bits "0000" and a code "1110" belonging to the group number S=4 with reference to the conversion table of FIG. 10. In the visual display control device 200, the variable-length decoding process 211 decodes the variable-length code into the sign-bit inverted predictive error of "1110001b=−15d". Subsequent to the variable-length decoding process 211, the inverse predictive coding process 212 adds the predictive value of "10d=0001010b" to the decoded predictive error of "1110001b=−15d" according to an equation (4).

$$0001010b + 1110001b = 1111011b \quad (4)$$

The inverse predictive coding process 212 negates the sign bit "1" in the addition result of "1111011b" so as to produce pixel data X of "111011b=59d". That is, decoded pixel data is determined based on the predictive value and the predictive error (except for its sign bit). In the predictive coding device 100 of the second embodiment, when the absolute value of the predictive error decreases due to the sign bit inversion of the predictive error, the predictive error conversion process 142 performing the sign bit inversion on the predictive error is followed by the variable-length coding process 143, thus reducing the length of the variable-length code constituting compressive coded data.

In the above, it is crucial that the reversible decoding process 210 is essentially equivalent to the foregoing decoding process for decoding pixel data subjected to reversible compressive coding according to a compressive coding algorithm implementing both the predictive coding and the variable-length coding. For this reason, it is possible to employ a conventional decoding circuit performing the reversible decoding process 210 (not shown in FIG. 1), which decodes pixel data subjected to reversible compressive coding according to the compressive coding algorithm implementing both the predictive coding and the variable-length coding. In other words, the visual display control device 200 of the second embodiment is able to perform a first decoding operation for decoding pixel data subjected to irreversible compressive coding and a second decoding operation for decoding pixel data subjected to reversible compressive coding. If the compressive coding device 100 skips the expansion process 132, the visual display control device 200 needs to perform an additional operation equivalent to the expansion process 132. In this case, it is impossible to use the conventional decoding circuit, which needs to be modified to cope with the above situation. In the case of a visual processing LSI device having a line-buffer configuration which performs decoding in units of lines, it is necessary to perform a complex expansion process spanning over lines, for which it is necessary to modify the decoding circuit in a complicated manner. In contrast, the second embodiment allows the compressive coding device 100 to perform the expansion process 132; this makes it possible to configure the visual display control device 200 by directly using the decoding circuit for decoding visual data subjected to reversible compressive coding according to the compressive coding algorithm implementing both the predictive coding and the variable-length coding. This is the reason why the second embodiment incorporates the expansion process 132 in the compressive coding device 100.

The inverse quantization process 220 is the inverse of the quantization process 133, wherein it interpolates reduced bits of pixel data which are reduced in the quantization process 133. The quantization-mode signal, which is transmitted from the compressive coding device 100 to the visual display control device 200, represents pixel data whose bits are reduced in the quantization process 133 and the number of reduced bits. In response to the quantization-mode signal, the inverse quantization process 220 interpolates pixel data with respect to components Y, Cb, and Cr according to Table 2.

TABLE 2

| Quantization-Mode Signal | Y-Component | Cb-Component | Cr-Component |
|---|---|---|---|
| 0 | Y[7:0] | Cb[7:0] | Cr[7:0] |
| 1 | Y[6:0], Y[6] | Cb[7:0] | Cr[7:0] |
| 2 | Y[6:0], 7[6] | Cb[6:0], Cb[6] | Cr[6:0], Cr[6] |
| 3 | Y[5:0], Y[5:4] | Cb[7:0] | Cr[7:0] |
| 4 | Y[5:0], Y[5:4] | Cb[6:0], Cb[6] | Cr[6:0], Cr[6] |
| 5 | Y[5:0], Y[5:4] | Cb[5:0], Cb[5:4] | Cr[5:0], Cr[5:4] |
| 6 | Y[4:0], Y[4:2] | Cb[5:0], Cb[5:4] | Cr[5:0], Cr[5:4] |

In the case of MODE=1, for example, the quantization process 133 of the compressive coding device 100 reduces one bit from Y-component pixel data, which is thus cast into seven bits (e.g. Y[6:0] in Table 2). In contrast, the inverse quantization process 220 of the visual display control device 200 adds the reduced bit (e.g. Y[6]), which is a first bit of Y-component pixel data, as a last bit of Y-component pixel data, so that pixel data is reproduced in eight bits.

Figure 11A:
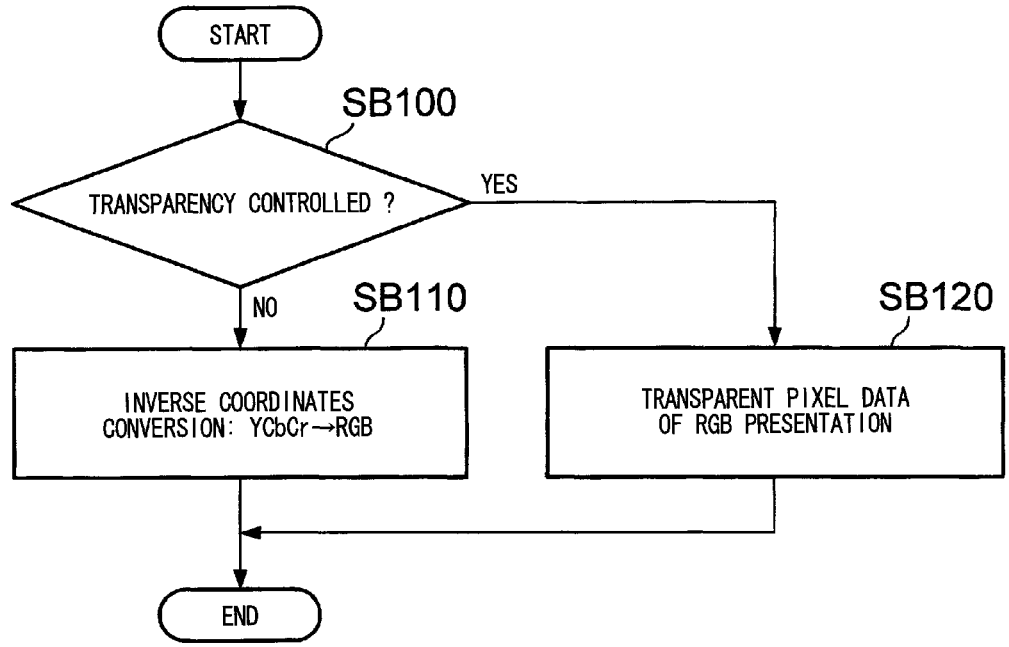
FIG. 11A is a flowchart showing a display control process of the visual display control device upon receiving an instruction disabling transparency control.
Figure 11B:
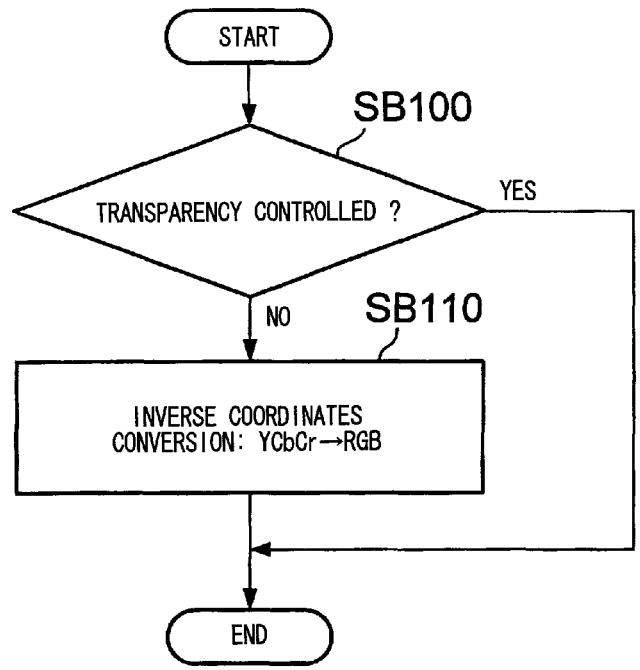
FIG. 11B is a flowchart showing a display control process of the visual display control device upon receiving an instruction enabling transparency control.

The display control process 230 selects pixel data output from the inverse quantization process 220 in a raster-scanning sequence, so that selected pixel data are sequentially converted into pixel data of the RGB presentation according to flowcharts shown in FIGS. 11A and 11B. Specifically, upon receiving an instruction disabling transparency control with an operator console (not shown) of the visual display control device 200, the display control process 230 proceeds to the flowchart of FIG. 11A. In contrast, upon receiving an instruction enabling transparency control, the display control process 230 proceeds to the flowchart of FIG. 11B.

In the flowchart of FIG. 11A, the display control process 230 firstly makes a decision as to whether or not each pixel data is ascribed to transparency control in step SB100. This decision can be implemented in various ways. For example, it is possible to determine whether or not each pixel data is out of the mapping range calculated according to the mapping rule (1). Alternatively, it is possible to determine whether or not the Y component of each pixel data is solely out of the mapping range (e.g. "16" in decimal notation). The second embodiment allows step SB100 to solely deal with the Y component of pixel data because of the following reason.

Each pixel data is already subjected to the reduction process 131 and the expansion process 132 as shown in FIGS. 5A and 5B with respect to components Cb and Cr. The second embodiment cannot always guarantee that the components Cb and Cr of pixel data having the controlled object indicator are eliminated through the reduction process 131 and the expansion process 132, or other pixel data are interpolated using pixel data having the controlled object indicator. On the other hand, the Y component of pixel data skips the reduction process 131 and the expansion process 132 so that it is said to be subjected to reversible compressive coding although the compressive coding device 100 performs irreversible compressive coding entirely. In the visual display control device 200, the Y component of pixel data ascribed to transparency control is decoded into a certain value indicating the transparency control, while the Y component of pixel data disusing transparency control is decoded into a value representing the original brightness (or intensity) thereof. For this reason, it is possible to precisely determine whether or not each pixel data is ascribed to transparency control by making a decision as to whether or not the Y component of pixel data is out of the mapping range according to the mapping rule (1).

When the decision result of step SB100 is "NO", the display control process 230 proceeds to step SB110 regarding an inverse coordinates conversion process. The inverse coordinates conversion process is similar to the YCbCr→RGB conversion process 60a. When the decision result of step SB100 is "YES", the display control process 230 proceeds to step SB120 in which it outputs "transparent" pixel data owing to transparency control and rendered in the RGB presentation. Herein, the transparency indicates a certain color of the RGB presentation (in other words, the original color of each pixel on the original picture) with respect to pixel data ascribed to transparency control. According to the flowchart of FIG. 11A, the display control process 230 provides a display unit (not shown) with all the pixels output from the inverse quantization process 220 and rendered in the RGB presentation. Thus, the display unit renders all pixels of visual data in the RGB presentation on screen.

In contrast, the display control process 230 implements the flowchart of FIG. 11B upon receiving the instruction enabling transparency control. Compared with the flowchart of FIG. 11A, the flowchart of FIG. 11B does not include step SB120 which is executed when the decision result of step SB100 is "YES". In the flowchart of FIG. 11B, pixel data ascribed to transparency control (i.e. pixel data causing the decision result of "YES" in step SB100) are not subjected to step SB120 so that the display unit display visuals lacking those pixels on screen. That is, when those "lacked" pixels are rendered in the overlay representation over the background image, they are not displayed while the background image partially appears instead of them, thus achieving transparency control.

Figure 14A:
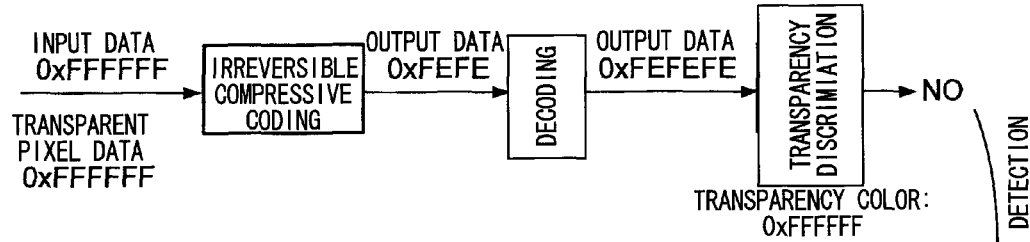
FIG. 14A shows an erroneous procedure in which transparent pixel data is erroneously discriminated as nontransparent pixel data.
Figure 14B:
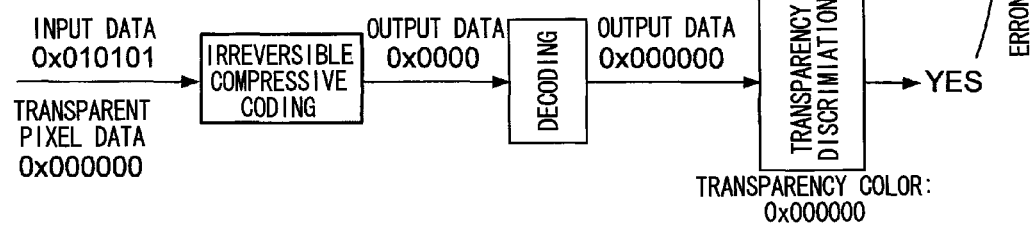
FIG. 14B shows an erroneous procedure in which nontransparent pixel data is erroneously discriminated as transparent pixel data.
Figure 14C:
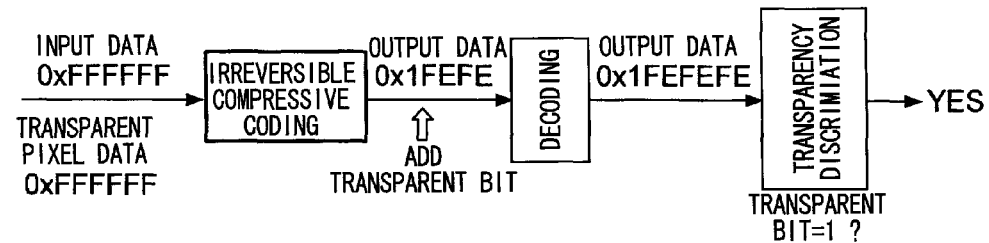
FIG. 14C shows a corrective procedure in which an additional bit of "1" is added to pixel data so as to correctively discriminate it as transparent pixel data.
Figure 14D:
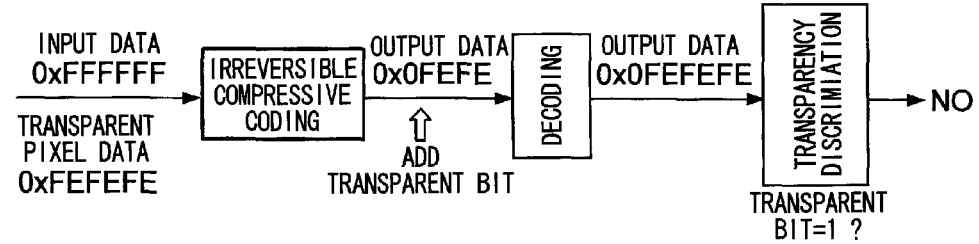
FIG. 14D shows a corrective procedure in which an additional bit of "0" is added to pixel data so as to correctively discriminate it as nontransparent pixel data.

Since transparency control data is small in data size compared to the additional information (e.g. additional bits shown in FIGS. 14A and 14B), it is possible to suppress a reduction of the compression factor. In addition, the second embodiment is able to precisely discriminate pixel data ascribed to transparency control within pixel data subjected to the irreversible compressive coding and decoding. That is, it is possible to precisely perform transparency control in the decoding device while preventing the compression factor from being significantly reduced in the irreversible compressive coding on pixel data ascribed to transparency control.

3. Third Embodiment

Figure 12:
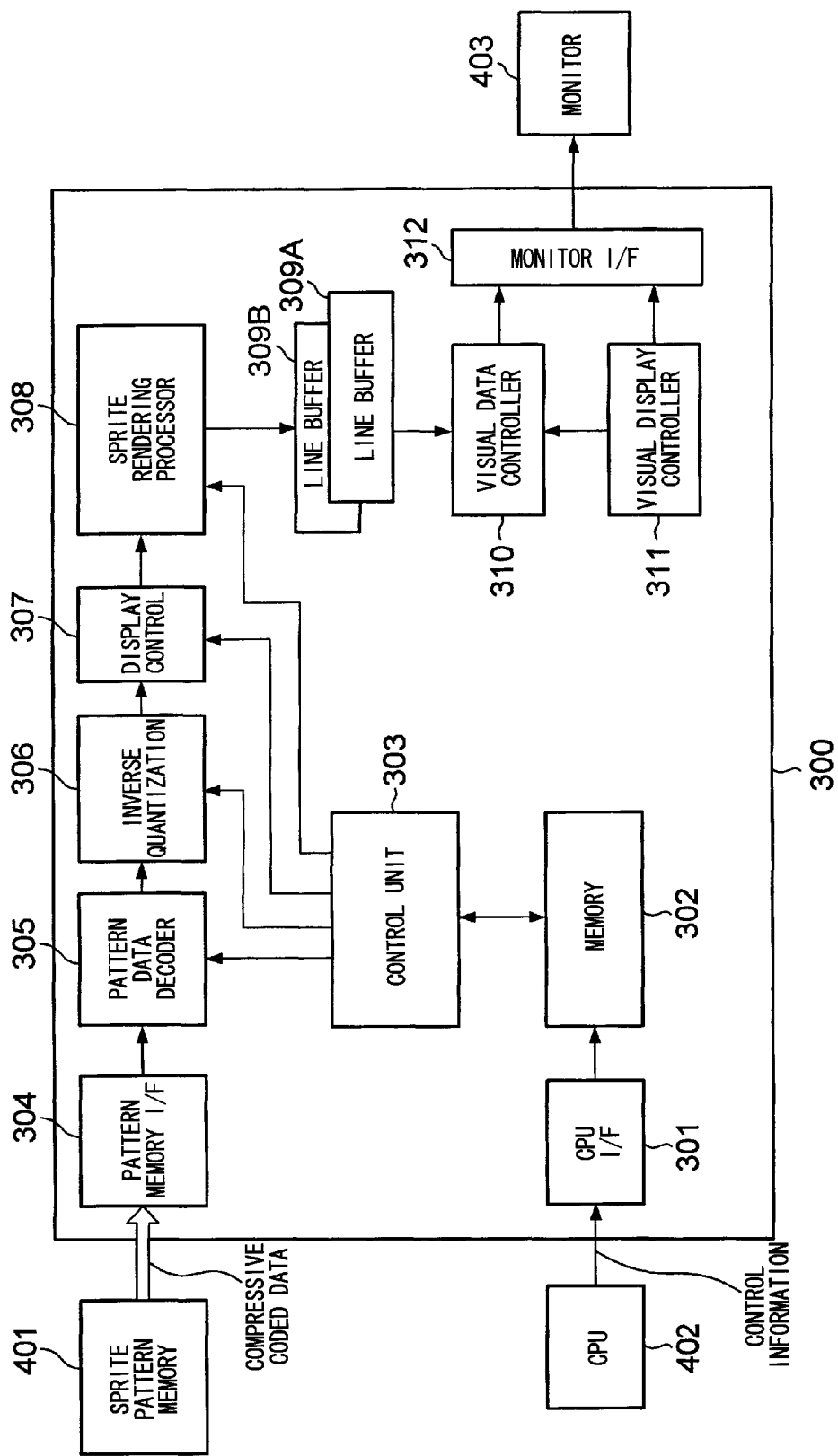
FIG. 12 is a block diagram showing the constitution of a visual processing LSI device according to a third embodiment of the present invention.

FIG. 12 is a block diagram showing the constitution of a visual processing LSI device 300 having a line-buffer configuration, which serves as a visual display control device, according to the third embodiment of the present invention. The visual processing LSI device 300 is built in a game device, for example. It implements the overlay presentation with respect to sprites (e.g. game characters) and the background image (e.g. a game scene) on screen of a monitor 403 under control of a CPU 402 serving as a control center of the game device. Specifically, the compressive coding device 100 performs the irreversible compressive coding on visual data of sprites so as to produce compressive coded data, which are stored in a sprite pattern memory 401. The visual processing LSI device 300 reads compressive coded data from the sprite pattern memory 410 and decodes them into pixel data under control of the CPU 402. It displays sprites corresponding to decoded pixel data on screen of the monitor 403 in units of horizontal lines. In this connection, FIG. 12 shows only the essential parts closely related to the decoding and reproduction of compressive coded data within the entire constitution of the visual processing LSI device 300; hence, it does not show other parts.

The sprite pattern memory 401 is configured of a ROM storing compressive coded data representing plural patterns of sprites, for example.

Figure 13:
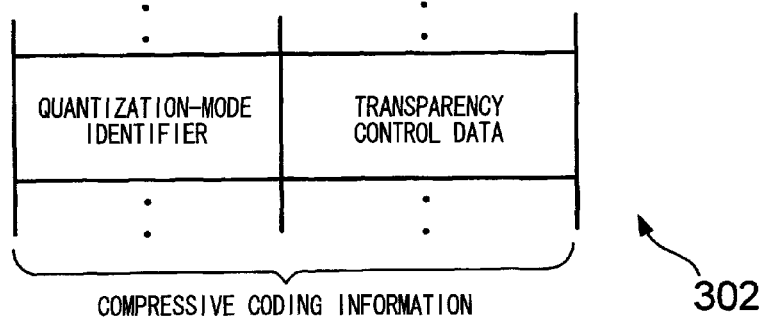
FIG. 13 shows an example of the configuration of compressive coding information stored in memory of the visual processing LSI device.

In the visual processing LSI device 300, a CPU interface (or CPU I/F) 301 receives control information from the CPU 402. A memory 302 stores the control information which the CPU 402 supplies via the CPU interface 301. It is configured of a RAM, for example. The control information which the CPU 402 supplies to the memory 302 includes addresses of the sprite pattern memory 401 storing compressive coded data of sprites which are subjected to decoding and reproduction, positions of displaying sprites on screen of the monitor 403, instructions regarding reduction and expansion of sprites, and compressive coding information. As shown in FIG. 13, the compressive coding information includes transparency control data and a quantization-mode identifier representing a quantization mode. Herein, transparency control data represent the same color in common, or they are allocated with different colors regarded as transparency. In addition, transparency control data represent the same controlled object indicator, or they are allocated with different controlled object indicators.

A control unit 303 is a control center that controls the constituent parts of the visual processing LSI device 300 according to the control information stored in the memory 302. Under control of the control unit 303, a pattern memory interface (I/F) 304 accesses compressive coded data stored in areas designated by addresses, included in the control information of the memory 302, in the sprite pattern memory 401. A pattern data decoder 305 implements the foregoing reversible decoding process 210. Under control of the control unit 303, the pattern data decoder 305 reads compressive coded data of sprites from the sprite pattern memory 401 via the pattern memory interface 304. It performs the foregoing variable-length decoding process 211 and the inverse predictive coding process 212 on compressive coded data of sprites. Thus, it is possible to reproduce pixel data, which are produced by way of the data conversion process 120 and the irreversible conversion process 130 on original visual data of pixels (prior to the compressive coding) rendered in the RGB presentation.

Pixel data output from the pattern data decoder 305 are supplied to an inverse quantization unit 306 and a display control unit 307 so that they are subjected to the inverse quantization process 220 and the display control process 230 in turn, thus reproducing pixel data of the RGB presentation. Specifically, the inverse quantization unit 306 performs the inverse quantization process 220 according to the quantization-mode identifier of the compressive coding information included in the control information of the memory 302. The display control unit 307 performs a display control procedure shown in FIG. 11A or FIG. 11B in accordance with transparency control data included in the compressive coding information and an instruction given from the control unit 303, as to whether or not to perform transparency control. Pixel data passing through the display control procedure of the display control unit 307 is subjected to rendering in a sprite rendering processor 308 and stored in a line buffer 309A or 309B.

Each of the line buffers 309A and 309B has a capacity of storing one-line of pixel data on screen of the monitor 403. The control unit 303 alternately uses the line buffers 309A and 309B. In a period for displaying one line of pixel data stored in the line buffer 309A on screen of the monitor 403, for example, the control unit 303 has the sprite rendering processor 308 perform rendering for writing next line of pixel data into the line buffer 309B. In another period for displaying one line of pixel data stored in the line buffer 309B on screen of the monitor 403, the control unit 303 has the sprite rendering processor 308 perform rendering for writing next line of pixel data into the line buffer 309A. Under control of the control unit 303, the pattern data decoder 305, the inverse quantization unit 306, and the display control unit 307 prepare for one line of pixel data (representing a part of a sprite) subjected to rendering so that the sprite rendering processor 308 can timely perform rendering. Occasionally, it needs to display plural types of sprites on one line on screen of the monitor 403. In this case, the control unit 303 accesses the sprite pattern memory 401 to read compressive coded data needed to obtain one line of pixel data with respect to all sprites which should be displayed on screen of the monitor 403. Subsequently, read compressive coded data are supplied to the pattern data decoder 305 and subjected to decoding.

A visual data controller 310, a display controller 311, and a monitor interface (I/F) 312 read one line of pixel data alternately from the line buffers 309A and 309B and supply them to the monitor 403 so as to display images and graphics on screen. Specifically, the display controller 311 supplies a vertical synchronization signal and a horizontal synchronization signal to the monitor 403 via the monitor interface 312. In addition, it sends a read instruction of pixel data to the visual data controller 310 in synchronization with the horizontal synchronization signal. Upon receiving a read instruction of pixel data, the visual data controller 310 alternately selects the line buffers 309A and 309B so as to read one line of pixel data from the selected line buffer 309 and to send them to the monitor 403 via the monitor interface 312.

The visual processing LSI device 300 of the third embodiment works in a manner similar to the visual display control device 200, so that it is able to precisely perform transparency control without imparting the advantage of the irreversible compressive coding. The third embodiment is applied to the visual processing LSI device 300 having the line-buffer configuration; but this is not a restriction. It is applicable to a visual processing LSI device having a frame-buffer configuration, which is equipped with a frame buffer storing one frame of pixel data so as to perform rendering in units of frames.

4. Variations

It is possible to modify the above embodiments by way of the following variations.

(1) The third embodiment uses the compressive coding information including the quantization-mode identifier, but the compressive coding information does not necessarily include the quantization-mode identifier when a predetermined quantization mode is set to the quantization process 133 in advance. It is possible to store the compressive coding information in the sprite pattern memory 401 in connection with compressive coded data. In this case, the control information which the CPU 402 supplies to the control unit 303 does not necessarily include the compressive coding information.

(2) The second embodiment reduces the number of bits constituting any one of components of pixel data subjected to the reversible compressive coding process 140 by way of the quantization process 133, but the quantization process 133 is not necessarily essential to the present invention; hence, it can be disused. Needless to say, when the quantization process 133 is disused in the compressive coding device 100, it is unnecessary to perform the inverse quantization process 220 in the decoding device for decoding compressive coded data which are produced without using the quantization process 133. In the second embodiment, the predictive error output from the predictive coding process 141 is subjected to the predictive error conversion process 142 and subsequently subjected to the variable-length coding process 143; but it is possible to omit the predictive error conversion process 142. In the second embodiment, the reversible compressive coding process 140 includes both of the predictive coding process 141 and the variable-length coding process 143, but it simply needs to include at least the predictive coding process 141.

(3) In the second embodiment, the quantization process 133 is followed by the reversible compressive coding process 140; but this is not a restriction. The second embodiment can be redesigned to use an irreversible compressive coding process ensuring an irreversible compressive coding and decoding algorithm guaranteeing that pixel data ascribed to transparency control and passing through the irreversible compressive coding and decoding certainly become out of the mapping range.

(4) In the first embodiment, pixel data are subjected to either the RGB→YCbCr conversion process 20a or the all-zero conversion process 20b based on the discrimination result of the transparency discrimination process 10 and are subsequently subjected to the irreversible compressive coding process 30; but this is not a restriction. It is possible to employ a reversible compressive coding process securing a reversible compressive coding and decoding algorithm guaranteeing that pixel data ascribed to transparency control are out of the mapping range.

(5) In order to minimize the degradation of picture quality owing to the irreversible conversion process 130 (especially, the reduction process 131 and the expansion process 132), the second embodiment mapping from the RGB presentation to the YCbCr presentation as the preprocessing; but this is not a restriction. It is possible to perform mapping from the RGB presentation to the LUV presentation. In addition, it is possible to employ other types of mapping such as RGB→YUV, RGB→YIQ, RGB→Lab, RGB→HLS, RGB→HSV, RGB→CMY, and RGB→CMYK. Similar to the mapping rule (1), these types of mapping can be expressed as mapping rules calculating components of pixel data of the converted presentation based on the linear combination of pixel data composed of three color components in the original presentation prior to conversion. That is, they calculate three color components of pixel data in the converted presentation based on the linear combination of three color components of pixel data in the original presentation prior to conversion.

(6) For example, it is possible to convert R, G, B components of pixel data into the R-component of pixel data, the difference "G-R" between the G-component and the R-component of pixel data, and the difference "B-R" between the B-component and the R-component of pixel data. Alternatively, it is possible to convert them into the G-component of pixel data, the difference "R-G" between the R-component and the G-component of pixel data, and the difference "B-G" between the B-component and the G-component of pixel data. It is possible to convert them into the B-component of pixel data, the difference "R-B" between the R-component and the G-component of pixel data, and the difference "G-B" between the G-component and the B-component of pixel data. When the data conversion process 120 of step SA110 calculates three color components of pixel data in the converted presentation based on the linear combination of three color components of pixel data in the original presentation, it is necessary to set the controlled object indicator to a value out of the mapping range according to the predetermined mapping rule, such as a value lower than the lower-limit value of the mapping range or a value higher than the upper-limit value of the mapping range.

(7) Three color components of pixel data in the converted presentation, which are calculated based on the linear combination of three color components of pixel data in the original presentation are not necessarily above zero; hence, they are possibly set to negative values. The inverse predictive coding process 212 of the second embodiment operates on the precondition that pixel data prior to the predictive coding are above zero; hence, it is inconvenient that "converted" pixel data take negative values. To cope with such a drawback, when converted pixel data output from the data conversion process 120 are likely set to negative values, converted pixel data are subjected to level shifting (by adding a certain positive value or the like) so as to forcibly increase them above zero. In order to prevent the outstanding degradation of picture quality, it is preferable to perform the level shifting prior to the irreversible conversion process 130.

(8) The second embodiment performs the reduction process 131 and the expansion process 132 on the components Cb and Cr of pixel data in the YCbCr presentation output from the data conversion process 120; however, it is possible to perform them on one of the components Cb and Cr of pixel data. Similarly, it is possible to perform the reduction process 131 and the expansion process 132 on at least one of three components of pixel data in the other converted presentation (which differs from the YCbCr presentation) which are produced based on the linear combination of three color components of pixel data in the original presentation. In this connection, it is possible to determine how to select one of three components of pixel data subjected to the reduction process 131 and the expansion process 132 without causing a substantial degradation of picture quality.

(9) In the first and second embodiments, the irreversible compressive coding program, which is essential to the present embodiment, is installed in the compressive coding devices 1 and 100. Of course, it is possible to write an irreversible compressive coding program in a computer-readable storage media such as a CD-ROM and to distribute them to users or consumers. Alternatively, it is possible to download the irreversible compressive coding program to users or consumers via telecommunication lines such as the Internet. Similar, it is possible to write a decoding program in a computer-readable storage media and to distribute them to users or consumers. Alternatively, it is possible to download the decoding program to users or consumers via telecommunication lines.

Lastly, the present invention is not necessarily limited to the above embodiments and variations, which can be further modified in various ways within the scope of the invention as defined in the appended claims.

What is claimed is:

1. A compressive coding device comprising:
    a discrimination section which discriminates whether or not three color components of pixel data rendered in a first color presentation are each ascribed to transparency control;
    a conversion section which converts the pixel data of the first color presentation not ascribed to the transparency control into pixel data of a second color presentation according to a mapping rule while converting the pixel data of the first color presentation ascribed to the transparency control into a predetermined value out of a mapping range according to the mapping rule, the pixel data converted into the predetermined value out of the mapping range being configured to not be displayed; and
    an irreversible compressive coding section which performs irreversible compressive coding on the converted pixel data output from the conversion section, thus producing compressive coded data, wherein at least one of the three color components of the converted pixel data is subjected to reversible compressive coding, while the other component(s) of the converted pixel data are subjected to the irreversible compressive coding, and wherein the irreversible compressive coding includes a reduction process for thinning out pixel data at a certain ratio and an expansion process for interpolating thinned out pixel data by use of pixel data that has not been thinned out with respect to the three color components of the converted pixel data.

2. The compressive coding device according to claim 1, wherein the pixel data ascribed to the transparency control is subjected to mapping so that it is converted into the predetermined value which is higher than an upper-limit value of the mapping range or lower than a lower-limit value of the mapping range.

3. A visual display control device which implements display control using compressive coded data produced by the compressive coding device according to claim 1, comprising:
   a receiving section which receives the compressive coded data from the compressive coding device;
   a decoding section which decodes the compressive coded data via the inverse of irreversible compressive coding; and
   a display control section which discriminates whether or not pixel data have a predetermined value out of a mapping range according to a mapping rule, so that the display control section performs transparency control on pixel data having the predetermined value out of the mapping range, while the display control section converts other pixel data into a first color presentation via the inverse of the mapping rule, thus controlling a display device to render the first color presentation.

4. A visual display control device which implements display control using compressive coded data, the visual display control device comprising:
   a receiving section which receives compressive coded data having a structure consistent with production according at least to (a) a discrimination of whether or not three color components of pixel data rendered in a first color presentation are each ascribed to transparency control, (b) a conversion of the pixel data of the first color presentation not ascribed to the transparency control into pixel data of a second color presentation according to a mapping rule and a conversion of the pixel data of the first color presentation ascribed to the transparency control into a predetermined value out of a mapping range according to the mapping rule, and (c) an irreversible compressive coding on the converted pixel data output from the conversions of (b), wherein the pixel data converted into the predetermined value out of the mapping range is configured to not be displayed, wherein at least one of the three color components of the converted pixel data is subjected to reversible compressive coding, while the other component(s) of the converted pixel data are subjected to the irreversible compressive coding, and wherein the irreversible compressive coding includes a reduction process for thinning out pixel data at a certain ratio and an expansion process for interpolating thinned out pixel data by use of pixel data that has not been thinned out with respect to the three color components of the converted pixel data;
   a decoding section which decodes the compressive coded data via the inverse of irreversible compressive coding; and
   a display control section which discriminates whether or not the decoded pixel data from the decoding section have a predetermined value out of the mapping range according to the mapping rule, so that the display control section performs transparency control on the decoded pixel data discriminated to have the predetermined value out of the mapping range, while the display control section converts other decoded pixel data from the decoding section into a first color presentation via the inverse of the mapping rule, thus controlling a display device to render the first color presentation.

\* \* \* \* \*